US011934278B1

(12) United States Patent
Thompson et al.

(10) Patent No.: US 11,934,278 B1
(45) Date of Patent: Mar. 19, 2024

(54) WRITE WINDOW PROTECTION MODE IN A TAPE LIBRARY

(71) Applicants: Nathan Christopher Thompson, Boulder, CO (US); Matthew Thomas Starr, Lafayette, CO (US); Matthew Ninesling, Arvada, CO (US); Walter Wong, Boulder, CO (US)

(72) Inventors: Nathan Christopher Thompson, Boulder, CO (US); Matthew Thomas Starr, Lafayette, CO (US); Matthew Ninesling, Arvada, CO (US); Walter Wong, Boulder, CO (US)

(73) Assignee: Spectra Logic Corporation, Boulder, CO (US)

( * ) Notice: Subject to any disclaimer, the term of this patent is extended or adjusted under 35 U.S.C. 154(b) by 0 days.

(21) Appl. No.: 18/114,393

(22) Filed: Feb. 27, 2023

Related U.S. Application Data

(60) Provisional application No. 63/428,164, filed on Nov. 28, 2022.

(51) Int. Cl.
| | |
|---|---|
| *G06F 11/14* | (2006.01) |
| *G11B 15/02* | (2006.01) |
| *G11B 15/06* | (2006.01) |
| *G11B 33/04* | (2006.01) |

(52) U.S. Cl.
CPC ........ *G06F 11/1461* (2013.01); *G11B 15/026* (2013.01); *G11B 15/06* (2013.01); *G11B 33/04* (2013.01); *G06F 2201/84* (2013.01)

(58) Field of Classification Search
CPC ............. G06F 11/1461; G06F 2201/84; G11B 15/026; G11B 15/06; G11B 33/04
See application file for complete search history.

(56) References Cited

U.S. PATENT DOCUMENTS

| | | | |
|---|---|---|---|
| 6,947,237 B2 | 9/2005 | Christie | |
| 7,814,554 B1 | 10/2010 | Ragner | |
| 8,732,417 B1* | 5/2014 | Stringham | .......... G06F 11/1458 |
| | | | 711/E12.103 |
| 9,105,307 B2 | 8/2015 | Earhart | |
| 11,403,184 B1* | 8/2022 | Kumar | ................ G06F 11/0772 |
| 11,829,257 B2* | 11/2023 | Trachy | ................ G06F 11/1461 |
| 2017/0116298 A1* | 4/2017 | Ravipati | ................ G06F 16/13 |

* cited by examiner

*Primary Examiner* — Andrew Sasinowski
(74) *Attorney, Agent, or Firm* — Kenneth Altshuler

(57) ABSTRACT

A data storage library is described that protects against a malware attack by providing a scheduled write window of time where archive data can be written to tape cartridges in the tape library on behalf of a client. At times outside of the write window, the tape library is disabled from writing any archive data to any of the tape cartridges in the tape library. Accordingly, the tape library is protected from a malicious entity attempting to download malware to tape cartridges in the tape library outside of the designated write windows. The tape library is configured to provide or otherwise read archived data from a tape cartridge both in the write window and outside of the write window.

20 Claims, 4 Drawing Sheets

WRITE WINDOW PROTECTION MODE IN A TAPE LIBRARY

CROSS-REFERENCE TO RELATED APPLICATIONS

This application is a non-provisional application claiming priority to and the benefit of U.S. Provisional Patent Application Ser. No. 63/428,164, entitled WRITE PROTECTED TAPE filed Nov. 28, 2022, the entire disclosure of which is hereby incorporated by reference.

FIELD OF THE INVENTION

1. Field of the Invention

The present invention relates generally to write protecting tape cartridges in tape libraries.

2. Description of Related Art

Data storage libraries, such as tape libraries, are typically used to store and retrieve large amounts of data for data manipulation and archiving purposes. These libraries are generally comprised of drive devices adapted to read and write data to and from tape cartridges that are often housed within the tape libraries. In the interest of protecting stored data from being overwritten, a write protection switch on tape cartridges can be physically toggled to halt anymore writing to these now write protected tape cartridges. The write protect switch on the tape cartridge is designed to be toggled by a human fingernail, obviously outside of any tape library or tape system. In fact, any tape cartridge designated as a WORM tape cartridge is done so when the tape is new and before loading the WORM tape cartridge in a tape library.

It is to improvements directed to write protecting tape cartridges that both methods and apparatus are disclosed herein.

SUMMARY OF THE INVENTION

The present embodiments generally relate to write protecting tape cartridges in tape libraries.

In that light, certain embodiments contemplate a method to protect tape cartridges via a write time window, the method comprising providing a tape library comprising a plurality of tape cartridges, a data connection from the tape library to a client and a microprocessor. The method further including disabling the tape library from receiving any archive data over the data connection transmitted to the tape library during an off-schedule that is defined by an off amount of time in a day. At least some of the archive data can be transmitted to the tape library over the data connection during an on-schedule that is defined by an on amount of time in the day, the off-schedule and the on-schedule repeat at a scheduled time over at least two consecutive days. Archived data can be read from the tape library anytime during the off-schedule and the on-schedule via the data connection and writing the archive data only during the on-schedule via the data connection.

A different embodiment contemplates a data protection method comprising steps for time windows for writing archive data to a tape library. The method can include a step for providing a tape library connected to a network via a data connection, which in certain embodiments can be the network interface, the tape library comprising a plurality of tape cartridges, a plurality of tape drives and a microprocessor. The tape library can be made to disable all the plurality of tape drives from writing archive data incoming over the network to any of the tape cartridges during a scheduled no-write window of time that is defined by an off amount of time in a day. The scheduled no-write window of time is a window of time during a day where archive data, or any data for that matter, can be read from a tape cartridge via a tape drive but cannot be written to a tape cartridge via a tape drive. The tape library can receive at least some of the archive data that is transmitted thereto over the data connection during a scheduled write window of time that is defined by a predetermined on-amount of time in the day, the off-schedule and the on-schedule repeat at a predetermined scheduled time over at least two consecutive days. The archived data can be read from the tape library anytime during the scheduled write window of time and the scheduled no-write window of time via the data connection.

In yet another embodiment of the present invention, a tape library protection method is contemplated, which can comprise a step for connecting a tape library to a wide area network, the tape library can generally comprise a plurality of tape cartridges, a plurality of tape drives, a random-access memory and a microprocessor, along with the other components generally known to those skilled in the art. With the tape library connected to the network, the tape library can be enabled to write archive data received over the wide area network to at least one of the plurality of tape cartridge during a write window of time in a day. The write window of time is a scheduled amount of time can be less than 6 hours in the day. The tape library can be disabled from writing the archive data received over the wide area network to any of the tape cartridges when outside of the write window of time. In this embodiment, the write window of time can be repeated over at least two of the days. The archived data can be read from the tape library anytime in the day.

DETAILED DESCRIPTION

Figure 1:
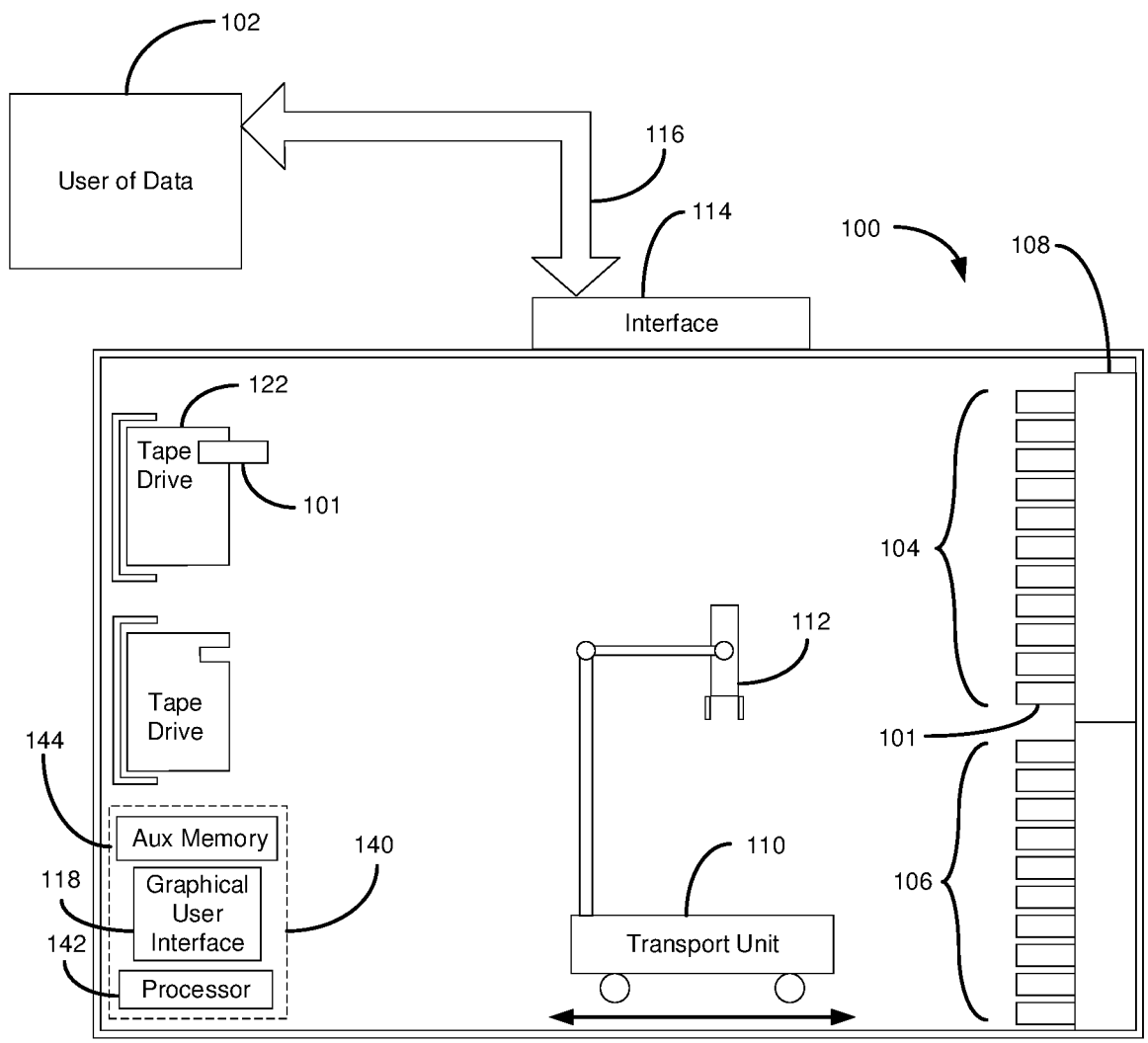
FIG. 1 is an illustration of a certain basic elements in a data storage library arrangement constructed in accordance with an embodiment of the present invention.

Initially, this disclosure is by way of example only, not by limitation. Thus, although the instrumentalities described herein are for the convenience of explanation, shown and described with respect to exemplary embodiments, it will be appreciated that the principles herein may be applied equally in other similar configurations involving the subject matter presented in the field of the invention. The phrases "an object of the invention", "in one embodiment", "according to one embodiment", and the like, generally mean the particular feature, structure, or characteristic following the phrase, is included in at least one embodiment of the present invention and may be included in more than one embodiment of the present invention. Importantly, such phases do not necessarily refer to the same embodiment. If the specification states a component or feature "may", "can", "could", or "might" be included or have a characteristic, that particular component or feature is not required to be included or have the characteristic. As used herein, the terms "having", "have", "including" and "include" are considered open language and are synonymous with the term "comprising". Furthermore, as used herein, the term "essentially" is meant to stress that a characteristic of something is to be interpreted within acceptable tolerance margins known to those skilled in the art in keeping with typical normal world tolerance, which is analogous with "more or less." For example, essentially flat, essentially straight, essentially on time, etc. all indicate that these characteristics are not capable of being perfect within the sense of their limits. Accordingly, if there is no specific +/− value assigned to "essentially", then assume essentially means to be within +/−2.5% of exact. The term "connected to" as used herein is to be interpreted as a first element physically linked or attached to a second element and not as a "means for attaching" as in a "means plus function". In fact, unless a term expressly uses "means for" followed by the gerund form of a verb, that term shall not be interpreted under 35 U.S.C. § 112(f). In what follows, similar or identical structures may be identified using identical callouts.

Embodiments of a tape library are described below in which a tape library is protected against a malware attack by providing a scheduled write window of time where archive data can be written to tape cartridges in the tape library on behalf of a client. At times outside of the write window, the tape library is disabled from writing any archive data to any of the tape cartridges in the tape library. Accordingly, the tape library is protected from a malicious entity attempting to download malware to tape cartridges in the tape library outside of designated write windows. The tape library is configured to provide or otherwise read archived data from a tape cartridge both in the write window of time and outside of the write window of time. It is to these innovations protecting tape cartridges that are unprotected at a hardware level from being written to ("write protected") at a software level that aspects of the present invention are generally directed. Below are several embodiments that help protect malicious data from being written to a tape.

As touched upon above, hacking into storage servers by way of loading malware thereon is a serious problem today. Aspects of the present invention are directed to protecting tape libraries from malware attacks. FIG. 1 is an illustration of certain basic elements in a data storage library arrangement 105 constructed in accordance with an embodiment of the present invention. The data storage arrangement 105 can comprise a user of data (client) 102 that is in communication with a data storage library 100 though a library interface device 114 over a data connection 116, which can be a wide area network (WAN), such as the internet at the largest WAN scale, for example. The library 100 comprises a plurality of tape cartridges 101 disposed in a shelf system 108, which in some embodiments contemplate the tape magazine (not shown). A tape magazine resembles a shoebox containing a plurality of tape cartridges 101. Simply put, the shelf system 108 holds tape cartridges 101 inside of the data storage library 100. Certain embodiments contemplate each of the tape cartridges 101 containing an auxiliary radio frequency memory device ("MAM", which is not shown) capable of storing auxiliary digital data. Other embodiments contemplate each tape cartridge 101 providing a write protect switch 202 that when toggled changes the tape cartridge 101 from a Write-Many/Read-Many (WMRM) tape cartridge to a read-only tape cartridge, shown in FIG. 2. In the present configuration, the data storage library 100 is depicted with two groups of tape cartridges 101, a scratch pool of WMRM tape cartridges 106 and a pool of archived data written tape cartridges 104 having archived data previously written thereto. Archived data is defined herein as data already stored in a tape library 100 or more specifically retained on one or more tape cartridges 101 within the tape library 100. Archive data is defined herein as data intended to be written to a tape cartridge 101 but not yet written thereto.

With continued reference to FIG. 1, there are two tape drives 122, each capable of reading and writing data to and from one of the plurality of tape cartridges 101. The tape cartridges 101 are moved between the shelf system 108 and the tape drives 122 via a robotic transport unit 110. The robotic transport unit 110 further possesses a picker device 112 that is adapted to grasp and release one of the tape cartridges 101 in the tape library 100. Hence, the robotic transport unit 110 and picker device 112 remove the tape cartridges 101 from the shelf system 108 and insert them 101 in the tape drive 122, one at a time, for example. Certain embodiments contemplate multiple robotic units 110 and multiple picker devices 112 in a data storage library 100. As further depicted, the data storage library 100 possesses auxiliary memory 144, microprocessors and other computing electronics and controllers (library computer) 140 that can control library ongoings, store and maintain programs, drivers, routines, data needed for rapid access, tape cartridge location information, etc., within the data storage library 100. The library computer 140 can comprise a hard disk drive, solid state memory device, and the like. The present embodiment includes a graphical user interface 118, which an operator (or those that manage the tape library) can use the input commands or data into the data storage library 100. Though not shown, a data storage library possesses CPUs, keyboard, power lines, fans, CAN (computer area network), buses, switches, and many other electrical and mechanical devices known to those skilled in the art.

Figure 2:
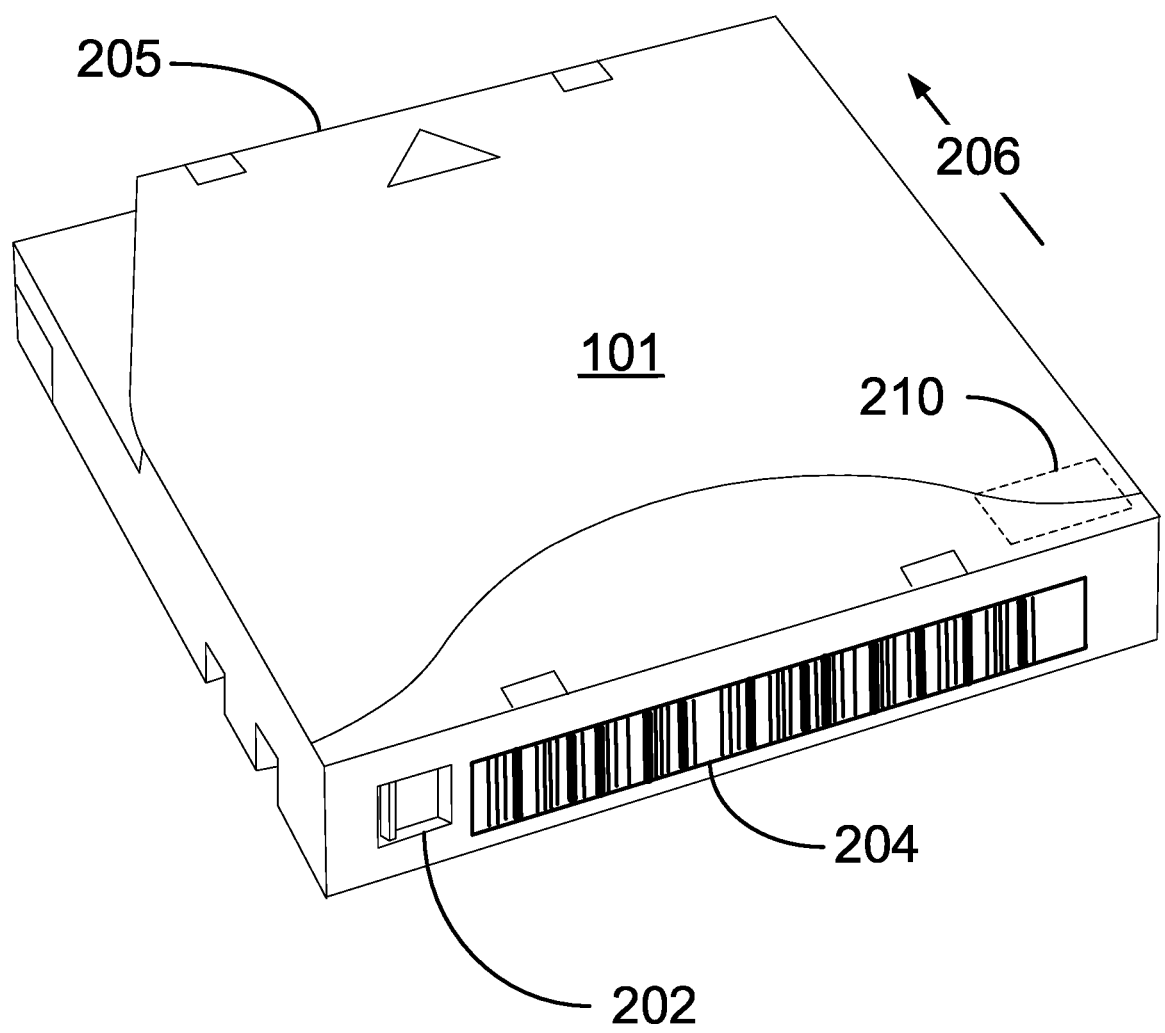
FIG. 2 is a line drawing illustratively depicting a tape cartridge consistent with embodiments of the present invention.

As depicted in FIG. 2, a tape cartridge 101 comes with a physical write protect tab 202 that locks the tape cartridge 101 in a read-only configuration. This is write protection at a hardware level. Write protection means that the tape cartridge 101 is disabled (protected) from being written to, such as when engaged with a tape drive 122. When toggled to write protection mode, the write protect switch 202 alters the tape cartridge 101 from a WMRM tape cartridge or a read-only tape cartridge. A tape cartridge 101 can only be written to when the write protect tab 202 is in the WMRM orientation.

With respect to other aspects of a tape cartridge 101, a bar code 204 is typically disposed on the outer face of a tape cartridge housing 205. The tape cartridge housing 205 contains tape medium (not shown) and the MAM 210 that is hidden within the outer housing 205, as well as other tape cartridge components known to those skilled in the art such as, a leader pin, spindle, etc. The arrow 206 indicates the direction that the tape cartridge 101 is inserted into a tape drive 122.

As is appreciated by those skilled in the art, if a tape cartridge 101 is to be used for writing data, then it cannot be write protected at a hardware level. Hence, the write protect tab 202 must be in a WMRM orientation for writing to the tape cartridge 101 to occur. This leaves the WMEM tape cartridge 101 unprotected at a hardware level exposing it to a malware attack. If a tape library 100 is attacked by malware that infiltrates tape library backup software (such Commvault software of Tinton Falls, New Jersey), a hacker can take over the part of the backup software that mounts tape cartridges 101 in tape drives 122 to control the backup processes in a tape library 100. If the tape library 100 falls under control to a hacker, archived data existing in tape cartridges 101 can become corrupted by the hacker, which effectively destroys the integrity of the data to original data owner. Moreover, the hacker can disrupt data storage operations, erase tape cartridges or otherwise cause great harm to archived data stored in a tape library 100.

One embodiment of the present invention contemplates locking a tape library 100 from mounting any tape cartridge 101 in a tape drive 122 for a write operation except at a certain time of the day, such as only between 7:00 am to 8:00 am and 11:00 pm to 12:00 μm, for example (a day consisting of 24 hours). This strategy limits opportunity for a hacker to embed malware in the tape library 100 because except for the small windows of time, the tape library 100 can only be read from and not written to. If a client 102 or an operator (not shown) wants to mount a tape cartridge 101 for a writing operation that is not in those time windows, then they must do something special like use a key or physically access the tape library 100, just to name a couple of examples.

Figure 3:
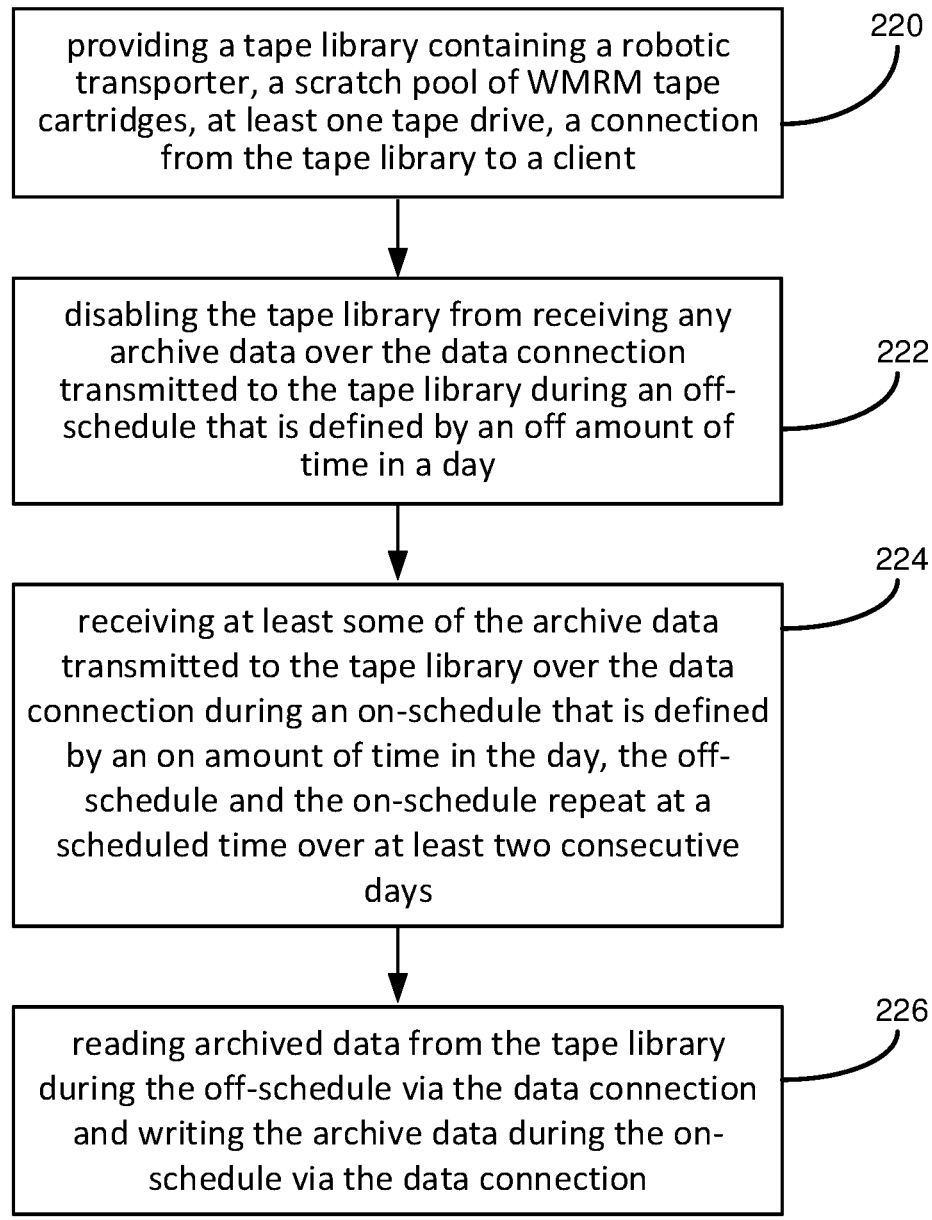
FIG. 3 is a flow chart of a method to protect tape cartridges via a write time window consistent with embodiments of the present invention.

FIG. 3 is a flow chart of a method to protect tape cartridges via a write time window consistent with embodiments of the present invention. FIG. 3 is described in view of FIG. 1. As shown in step 220, a tape library 100 is provided containing a robotic transporter 110, a microprocessor 142 a plurality of tape cartridges 101 that include a scratch pool of WMRM tape cartridges 106 and a plurality of tape cartridges with archived data 104, at least one tape drive 122, and a network connection 116 from the tape library 100 to a client 102.

As reflected in step 222, the tape library 100 is disabled from receiving any archive data over the data connection 116 that may be transmitted to the tape library 100 during an off-schedule amount of time. An off-schedule amount of time is defined by an "off amount" of time in a day that the tape library 100 cannot be written to. More specifically, the tape library 100 is governed by a software program that does not permit any incoming archive data (data intended to be archived on one or more tape cartridges 101) to be written to any of the tape cartridges 101 in the tape library 100 during the off-scheduled time. The off-scheduled time, which is a read-only window of time, can be the same for two or more consecutive days (e.g., at 12:00 am to 12:00 μm and 1:00 μm to 11:00 pm daily, for example). Optionally, the off-scheduled time can be at different times on different days or at a common time on only select days, such as two days a week, for example Mondays and Thursday, etc.

Step 224 is a step for receiving at least some of the archive data transmitted to the tape library 100 over the data connection 116 during an on-schedule that is defined by an "on amount" of time in the day. More specifically, the tape library 100 is governed by the software program that only permits incoming archive data to be written to at least one of the tape cartridges 101 in the tape library 100 during the on-scheduled time. The on-scheduled time, which is a reading and writing window of time, can be the same for two or more consecutive days (in the example used with the off-scheduled time, the on-scheduled time would be at 12:00 pm to 1:00 μm and 11:00 μm to 12:00 am daily). Optionally, the on-scheduled time can be at different times on different days or at a common time on select days, etc. The on-scheduled time occurs between the pauses in the off-scheduled time, meaning they do not overlap. In certain embodiments the off-schedule and the on-schedule repeat on a predefined schedule over at least two consecutive days.

Step 226 is a step for reading archived data from the tape library 100 anytime during the off-schedule and the on-schedule via the data connection but writing archive data only during the on-schedule via the data connection. In this way, the archive data can only be written to the tape library 100 during the on-schedule window of time thereby helping to protect the tape library 100 from a malicious data download attack.

Certain embodiments contemplate the method to protect tape cartridges 101 via a write time window being wherein the scheduled time is identical over the at least two consecutive days.

Another embodiment contemplates the method to protect tape cartridges 101 via a write time window being wherein the archive data is from a client 102, and those with knowledge of the off-schedule and the on-schedule consisting of the tape library 100, those that manage the tape library (operators) and the client 102.

Yet, another embodiment contemplates the method to protect tape cartridges 101 via a write time window being wherein none of the tape cartridges 101 can be written to during the off-schedule.

Still, yet another embodiment envisions the method to protect tape cartridges 101 via a write time window further comprising requiring authentication verification from a client 102 before writing the archive data during the on-schedule to one of the tape cartridges 101, wherein the archive data is received from the client 102. Authentication verification is defined as the client 102 being able to verify that they are authorized to access archived data from the library 100 and store archive data to the library 100. This can be accomplished by entering in a password or providing a key that is known to the library 100. In an optional embodiment, the client 102 must provide a multi-factor authentication, such as a code received over a text message or email, for example, after providing an original key, password or IP address.

The method embodiment to protect tape cartridges 101 via a write time window further contemplates the archive data comprising at least two sets of archive data (i.e., two different portions or 'chunks' of archive data), wherein each of the sets is received from a different client and likely from different origination locations (such as one set from one state in the US and another set from a different state in the US).

The method embodiment to protect tape cartridges 101 via a write time window further imagines requiring a special command (such as a key and moniker, for example) from a client 102 before writing the archive data during the on-schedule to one of the tape cartridges 101, wherein the archive data is received from the client 102.

The method embodiment to protect tape cartridges 101 via a write time window further pondering the on-schedule being no more than twice a day for between 20 minutes and 90 minutes otherwise the tape library 100 is in the off-schedule (or no write mode).

A different embodiment contemplates a data protection method comprising steps for time windows for writing archive data to a tape library 100. The method can include a step for providing a tape library 100 connected to a network 116 via a data connection, which in certain embodiments can be the network interface 114, the tape library 100 comprising a plurality of tape cartridges 101, a plurality of tape drives 122 and a microprocessor 142. The tape library can be made to disable all of the plurality of tape drives 122 from writing archive data incoming over the network 116 to any of the tape cartridges 101 during a scheduled no-write window of time that is defined by an off amount of time in a day (i.e., some predefined amount of time during the day where the tape library 100 will not accept any archive data to be written therein). The scheduled no-write window of time is a window of time during a day where archive data, or any data for that matter, can be read from a tape cartridge 101 via a tape drive 122 but cannot be written to a tape cartridge 101 via a tape drive 122. The tape library 100 can receive at least some of the archive data that is transmitted thereto over the data connection 116 during a scheduled write window of time that is defined by a predetermined on amount (that is an amount of on-time) of time in the day, the off-schedule and the on-schedule repeat at a predetermined scheduled time over at least two consecutive days. The archived data can be read from the tape library 100 anytime during the scheduled write window of time and the scheduled no-write window of time via the data connection 116.

The data protection method embodiment can further comprise a step for providing a client 102 that uses the tape library 100 with a schedule of when the scheduled write window of time occurs during the day before the day. This can further be where the scheduled no-write window of time occurs during a common time in each of the consecutive days, meaning at the same time each day.

The data protection method embodiment can further comprise a step for rejecting an IP address of an entity or client 102 that is attempting to write at least some of the archive data to the tape library 100 during the no-write window of time. In this embodiment, the clients that use the tape library 100 know what the schedule is for the write window so any entity trying to write data outside of this window is by default a suspicious entity and their IP address or some other source address or indicia that can be tied to the entity will be put on a list that is blocked from accessing the tape library 100. Certain embodiments envision over riding this blocked action through manual intervention to permit future writing attempts if the IP address has been rejected. Optionally, this could be remedied through a special command, such as a two factor authentication, some other indicia, a phone call, just to name several examples, from the entity permitting future writing attempts if the IP address has been rejected.

The data protection method embodiment further envisions that the scheduled write window of time occurs no more than two times in the day.

In yet another embodiment of the present invention, a tape library protection method is contemplated, which can comprise a step for connecting a tape library 100 to a wide area network 116, the tape library 100 comprising a plurality of tape cartridges 101, a plurality of tape drives 122, a random-access memory 144 and a microprocessor 142. With the tape library 100 connected to the network 122, enabling the tape library 100 to write archive data received over the wide area network 116 to at least one of the plurality of tape cartridge 101 during a write window of time in a day, the write window of time is a scheduled amount of time that is less than 6 hours in the day. The tape library 100 is disabled from writing the archive data received over the wide area network 116 to any of the tape cartridges 101 when outside of the write window of time. In this embodiment, the write window of time is repeated over at least two of the days. The archived data can be read from the tape library 100 anytime in the day.

The tape library protection method embodiment further comprising the microprocessor 142 running executable instructions stored in the random-access memory 144, the executable instructions running the enabling step, the disabling step, and the repeating step.

The tape library protection method embodiment further envisioning that the write window of time occurs no more than twice in the day. The tape library protection method embodiment further comprising writing the archive data only after an end-of-tape mark during the write window of time. Because data is written to tape medium inside of a tape cartridge 101 in a synchronous manner (as opposed to random writes as in a hard disc drive or solid-state drive) the end of the data written to the tape medium is concluded with an end-of-tape mark. In other words, the last bit of the synchronous data written to a tape medium is followed by an end-of-tape mark wherein after that, the tape medium is empty and open for new data to be written thereon.

Figure 4:
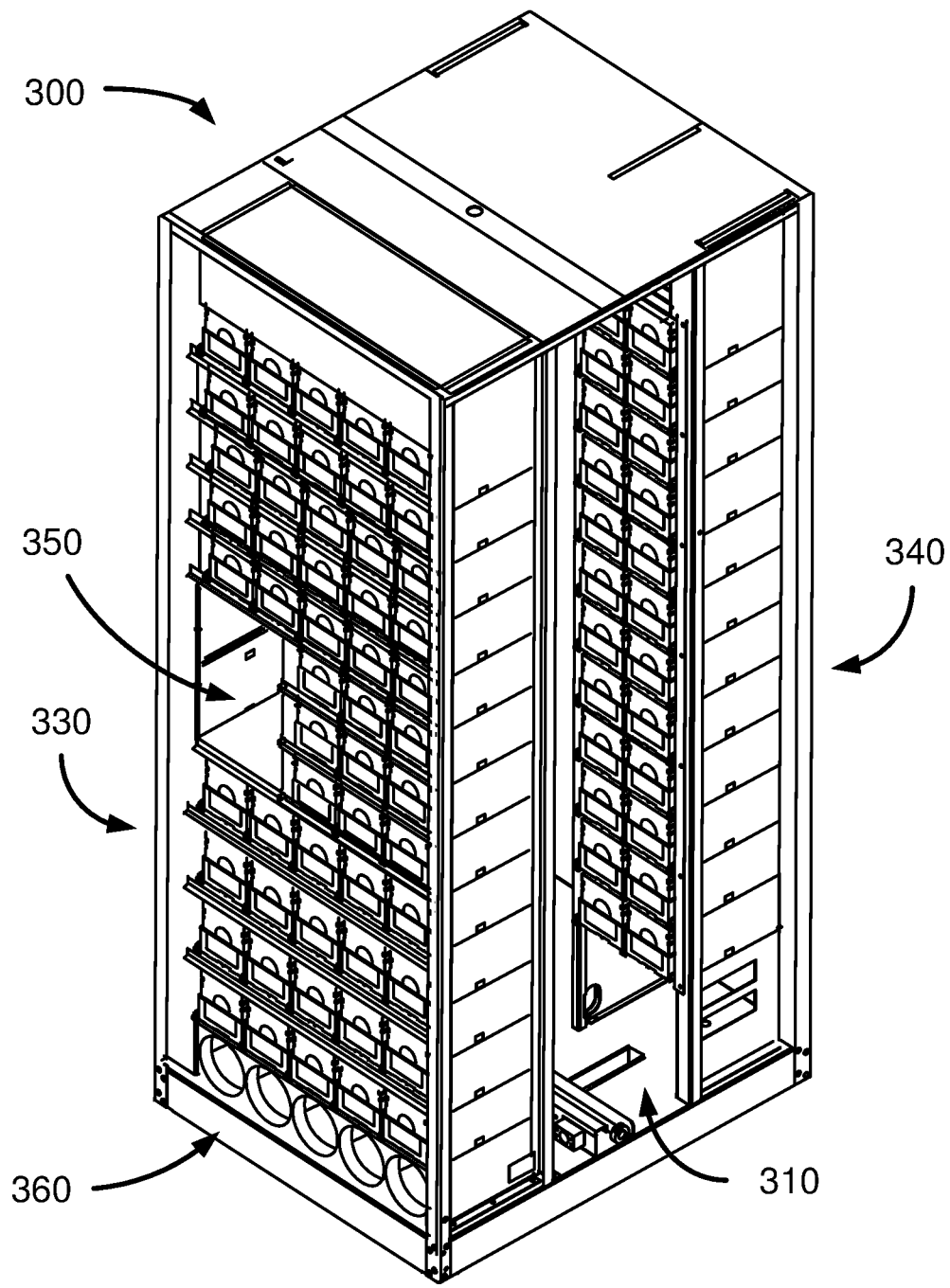
FIG. 4 is a line drawing illustrating a commercial embodiment of a tape library consistent with embodiments of the present invention.

Embodiments of the present invention can be commercially practiced in a Spectra Logic T-Finity tape cartridge library manufactured by Spectra Logic of Boulder Colorado, shown in FIG. 4. The T-Finity unit 300 comprises a first and second shelf system 330, 340 that are adapted to support a plurality of the removable storage devices, such as the tape cartridge magazines that contain a plurality of tape cartridges 101. The second shelf system 330 has at least one tape drive (not shown) adapted to read and write data to and from a selected tape cartridge 101. Functionally interposed between the first and second shelf system 330, 340 is a magazine transport space 310. The magazine transport space 310 provides adequate space for a tape cartridge magazine (not shown) to be moved, via a magazine transport (not shown), from a position in the shelf system 330, 340 to a tape drive (not shown). The selected tape cartridge 101 is transferred from the tape cartridge magazine to the tape drive and inserted there in via a picker device (not shown). Tape cartridge magazines can be transferred into and out from the T-Finity library via the entry/exit port 350. The T-Finity tape library 300 includes a means for cooling as shown by the fans 360 located at the base.

It is to be understood that even though numerous characteristics and advantages of various embodiments of the present technology have been set forth in the foregoing description, together with the details of the structure and function of various embodiments of the invention, this disclosure is illustrative only, and changes may be made in detail, especially in matters of structure and arrangement of parts within the principles of the present technology to the full extent indicated by the broad general meaning of the terms in which the appended claims are expressed. For example, multiple or even predetermined pluralities of scratch pools can be managed for example, while still maintaining substantially the same functionality without departing from the scope and spirit of the claimed invention. Another example can include using these techniques across multiple library partitions, while still maintaining substantially the same functionality without departing from the scope and spirit of the claimed invention. Finally, although the preferred embodiments described herein are directed to tape drive systems, and related technology, it will be appreciated by those skilled in the art that the claimed technology can be applied to other related storage systems, without departing from the spirit and scope of the present technology. Further, the terms "one" is synonymous with "a", which may be a first of a plurality.

It is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed is:

1. A method to protect tape cartridges via a write time window, the method comprising:
 providing a tape library comprising a plurality of tape cartridges, a data connection from the tape library to a client and a microprocessor;
 disabling the tape library from receiving any archive data over the data connection transmitted to the tape library during an off-schedule that is defined by an off amount of time in a day;
 receiving at least some of the archive data transmitted to the tape library over the data connection during an on-schedule that is defined by an on amount of time in the day, the off-schedule and the on-schedule repeat at a scheduled time over at least two consecutive days; and
 reading archived data from the tape library anytime during the off-schedule and the on-schedule via the data connection and writing the archive data only during the on-schedule via the data connection.

2. The method of claim 1, wherein the scheduled time is identical over the at least two consecutive days.

3. The method of claim 1, wherein the archive data is from a client, and those with knowledge of the off-schedule and the on-schedule consists of the tape library, those that manage the tape library and the client.

4. The method of claim 1, wherein none of the tape cartridges can be written to during the off-schedule.

5. The method of claim 1 further comprising requiring authentication verification from a client before writing the archive data during the on-schedule to one of the tape cartridges, wherein the archive data is received from the client.

6. The method of claim 1, wherein the archive data comprises at least two sets of archive data wherein each of the sets is received from a different client.

7. The method of claim 1 further comprising requiring a special command from a client before writing the archive data during the on-schedule to one of the tape cartridges, wherein the archive data is received from the client.

8. The method of claim 1, wherein the on-schedule is no more than twice a day for between minutes and 90 minutes otherwise the tape library is in the off-schedule.

9. A data protection method comprising:
 providing a tape library connected to a network via a data connection, the tape library comprising a plurality of tape cartridges, a plurality of tape drives and a microprocessor;
 the tape library disabling all of the plurality of tape drives from writing archive data incoming over the network to any of the tape cartridges during a scheduled no-write window of time that is defined by an off amount of time in a day;
 the tape library receiving at least some of the archive data transmitted to the tape library over the data connection during a scheduled write window of time that is defined by a predetermined on amount of time in the day, the off-schedule and the on-schedule repeat at a scheduled time over at least two consecutive days; and
 reading archived data from the tape library anytime during the scheduled write window of time and the scheduled no-write window of time via the data connection.

10. The data protection method of claim 9 further comprising providing a client that uses the tape library with a schedule of when the scheduled write window of time occurs during the day before the day.

11. The data protection method of claim 10, wherein the scheduled no-write window of time occurs during a common time in each of the consecutive days.

12. The data protection method of claim 9 further comprising rejecting an IP address of an entity attempting to write the at least some of the archive data to the tape library during the no-write window of time.

13. The data protection method of claim 12 further comprising requiring manual intervention permitting future writing attempts if the IP address has been rejected.

14. The data protection method of claim 12 further comprising requiring a special command from the entity permitting future writing attempts if the IP address has been rejected.

15. The data protection method of claim 9, wherein the archive data is from a client, and those with knowledge of the off-schedule and the on-schedule consists of the tape library, those that manage the tape library and the client.

16. The data protection method of claim 9, wherein the scheduled write window of time occurs no more than two times in the day.

17. A tape library protection method comprising:
 connecting a tape library to a wide area network, the tape library comprising a plurality of tape cartridges, a plurality of tape drives, a random-access memory and a microprocessor;
 enabling the tape library to write archive data received over the wide area network to at least one of the plurality of tape cartridge during a write window of time in a day, the write window of time is a scheduled amount of time that is less than 6 hours in the day;
 disabling the tape library from writing the archive data received over the wide area network to any of the tape cartridges when outside of the write window of time;
 repeating the write window of time over at least two of the days; and
 reading archived data from the tape library anytime in the day.

18. The tape library protection method of claim 17 further comprising the microprocessor running executable instructions stored in the random-access memory, the executable instructions running the enabling step, the disabling step, and the repeating step.

19. The tape library protection method of claim 17, wherein the write window of time occurs no more than twice in the day.

20. The tape library protection method of claim 17 further comprising writing the archive data only after an end-of-tape mark during the write window of time.

* * * * *